UNITED STATES PATENT OFFICE.

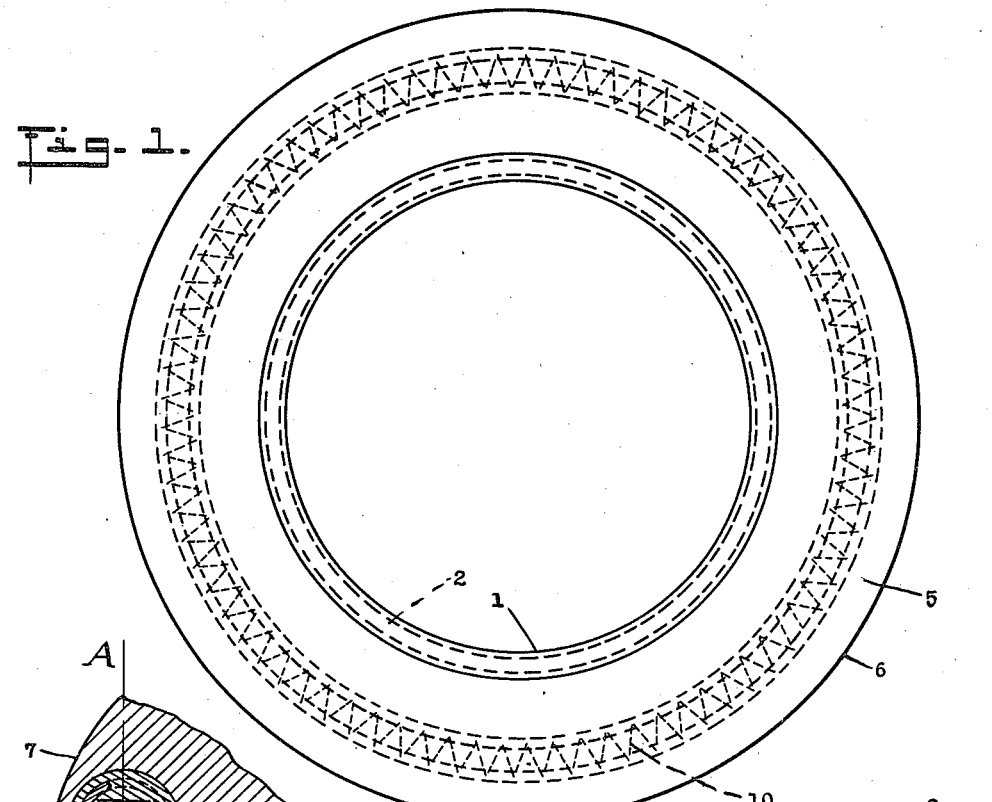

MALCOLM DICKERSON, OF NEWARK, NEW JERSEY, ASSIGNOR OF ONE-HALF TO FREDERICK L. LUZ, OF NEWARK, NEW JERSEY.

VEHICLE-TIRE.

1,165,398.  Specification of Letters Patent.  Patented Dec. 28, 1915.

Application filed July 9, 1914. Serial No. 849,867.

*To all whom it may concern:*

Be it known that I, MALCOLM DICKERSON, a citizen of the United States, residing at Newark, in the county of Essex and State of New Jersey, have invented certain Improvements in Vehicle-Tires, of which the following is a specification.

The objects of this invention are to provide for automobiles and the like a solid tire which shall be resilient enough to properly cushion the vehicle; to secure such resiliency by reducing the lateral thickness of the tire as by annular recesses in its opposite sides; to provide means for preventing the tire from bending laterally out of shape in turning corners or the like; to provide for this purpose stabilizing rings which hold the tire against displacement from its proper position; to assist in transmitting torque from the wheel rim to the tread of the tire and in distributing load pressures by means of said rings; to secure a construction which is simple and easily manufactured, and to obtain other advantages and results as may be brought out in the following description.

Referring to the accompanying drawings, in which like numerals of reference indicate the same parts throughout the several views, Figure 1 is a side view of a tire of my improved construction mounted upon a clencher rim; Fig. 2 is a cross section of the same; Fig. 3 is a portion of Fig. 2 on larger scale, and Fig. 4 is a detail side view of a portion of the tire partly in section on line A—A of Fig. 3.

In the specific embodiment of the invention shown in said drawings, 1 indicates a clencher rim to which my improved tire is secured by a hard rubber base 2 of less resiliency than the rest of the tire which is secured to said base by vulcanizing as at 3. It should be understood, however, that the tire can be mounted otherwise than by a clencher rim, and in fact can be adapted to any quick detachable rim or any other rim without departing in the least from the spirit and scope of the invention. The tire is preferably reduced in thickness just outside the clencher rim 1 as by annular recesses 4, 4, so as to reduce the weight and give it increased resiliency in a radial direction. Such resiliency might be secured otherwise than by the particular recesses shown, however. The outer portion 5 of the tire provides a peripheral tread 6 and laterally projecting side portions 7, 7 outside the recesses 4, 4. It is these side portions 7, 7 that are reinforced by my stabilizing rings as I have termed them, one ring extending along each laterally projecting portion 7 circumferentially of the tire and being vulcanized in place. Preferably the rings are arranged one in each of the laterally projecting side portions 7, 7 adjacent the recesses 4, 4 so as to be at a distance away from the tread 6 of the tire or above said tread when it is normally engaging the ground. The stabilizing rings which I have shown comprise each a continuous ring 8 having its ends preferably welded together, although it would be within the scope of the invention to otherwise join the ends. These annular rings are preferably spring steel, and I have shown them square in cross section, although they might be of any desired cross-sectional shape. Each ring 8 is preferably embedded and vulcanized in hard rubber 9, and I prefer to also embed in said hard rubber a helical coil 10 of resilient wire inclosing or wrapped around the ring 8, as clearly shown in the drawings, for reinforcing and firmly holding the hard rubber to the ring. Said ring 8 and helical spring 10 are embedded in the hard rubber 9, and then the whole embedded in the soft cushioning rubber of the body portion 3 of the tire and vulcanized thereto, as shown.

Obviously various detail modifications may be made in my improved tire without departing from the spirit and scope of the invention, and I do not wish to be understood as limiting myself except as required by the following claims when construed in the light of the prior art.

By means of my stabilizing rings which I have described, I am enabled to annularly recess the opposite sides of the tire between said rings and the rim to a depth and width which would otherwise be impossible, thus reducing the weight of the tire to a minimum and increasing its resiliency to the maximum, by leaving only an extended radial web between the recesses 4, 4. Of course this recessing would of itself produce a very unstable construction, unfit to transmit torque and which would lay or bend over sidewise very easily in rounding a curve or under a load, but these tendencies are corrected by my stabilizing rings as before described. Thus although I have a tire body of very unstable cross section, I render it perfectly practicable by the combination with it of the stabilizing ring.

Having thus described the invention, what I claim is.

1. A cushion tire comprising a solid rubber annulus or body portion with an inner base and an outer transversely rounded tread surface, and spaced resilient metal stabilizing rings circumferentially attached to the said body portion adjacent its opposite sides and thus distant radially and laterally from the middle part of its tread surface, the said body portion providing a median web of solid rubber extending between said rings radially from the base of the tire to said middle part of the tread surface and free to yield radially in the plane of the tire.

2. A cushion tire comprising a solid rubber annulus or body portion with an inner base and an outer transversely rounded tread surface and a median web extending radially from said base to said tread surface free to yield radially in the plane of the tire, and spaced resilient metal stabilizing rings circumferentially attached to said body portion adjacent the opposite edges of its tread surface at a greater distance from the base than from said tread surface.

3. A cushion tire comprising a solid rubber annulus or body portion with an inner base and an outer transversely rounded tread surface, said body portion having circumferential recesses in its opposite sides and a median web between said recesses extending radially from the base of the body portion to its tread surface, and spaced resilient metal stabilizing rings extending circumferentially of said body portion adjacent its opposite sides radially outward beyond said recesses, said rings being distant radially and laterally from the middle part of the tread surface and said body portion providing a middle portion of solid rubber extending between said rings for the radial thickness of the tire and free to yield radially in the plane of said middle part of the tread surface.

4. A cushion tire comprising a rubber annulus or body portion with a transversely convex tread surface and recesses in its opposite sides radially inward from said tread surface forming a comparatively thin web, and resilient metal stabilizing rings extending circumferentially of said body portion in the side parts thereof overhanging said lateral recesses and outside the radial planes of the sides of said web extended, whereby said rings are distant both radially and laterally from the middle part of the tread surface and said web and the body portion between said rings are free to yield radially.

5. A tire comprising a stabilizing ring of angular cross-section, an annular envelop of hard rubber on said ring, a helical coil embedded in said envelop and inclosing the stabilizing ring, and an annular body portion of softer rubber outside said envelop and vulcanized thereto.

MALCOLM DICKERSON.

Witnesses:
HOWARD P. KING,
JANET A. AYERS.